United States Patent
Mayer et al.

(10) Patent No.: US 7,317,695 B2
(45) Date of Patent: Jan. 8, 2008

(54) CONFERENCE CALL INITIATION

(75) Inventors: Georg Mayer, Helsinki (FI); Heikki Stahl, Espoo (FI)

(73) Assignee: Nokia Corporation, Espoo (FI)

( * ) Notice: Subject to any disclaimer, the term of this patent is extended or adjusted under 35 U.S.C. 154(b) by 930 days.

(21) Appl. No.: 10/445,305

(22) Filed: May 27, 2003

(65) Prior Publication Data

US 2004/0190702 A1   Sep. 30, 2004

(30) Foreign Application Priority Data

Mar. 25, 2003   (FI)   .................................. 20030448

(51) Int. Cl.
*H04L 12/16* (2006.01)
(52) U.S. Cl. .................. 370/261; 709/202.01
(58) Field of Classification Search ................ 370/260, 370/261, 262, 312, 352, 389, 395.52, 522, 370/395.2; 709/202.01, 204.01, 205.01, 709/203.01
See application file for complete search history.

(56) References Cited

U.S. PATENT DOCUMENTS

2004/0073566 A1 *   4/2004   Trivedi ........................ 707/102
2004/0202303 A1 *   10/2004   Costa-Requena et al. ...................... 379/205.01

* cited by examiner

*Primary Examiner*—Creighton Smith
(74) *Attorney, Agent, or Firm*—Squire, Sanders & Dempsey L.L.P.

(57) ABSTRACT

An apparatus and method initiates a conference call in a telecommunication system. A call set up message is sent by a user's equipment, a message header indicating the equipment's own public identity as the call recipient and a tag indicating that the user equipment only accepts a conference call server as the recipient of the message. A network element configured to process messages from the user equipment receives the message and redirects the message to a conference call server on the basis of the header fields of the message. The conference call server detects that the message is a conference call set up message on the basis of the header fields of the message, and establishes a conference call.

12 Claims, 3 Drawing Sheets

CONFERENCE CALL INITIATION

BACKGROUND OF THE INVENTION

1. Field of the Invention

The invention relates to a method of initiating a conference call and to a respective arrangement in a telecommunication system.

2. Description of the Related Art

The most common service provided by radio telecommunication systems has long been a point-to-point telephone call. The systems have provided only mobility as a new feature compared to fixed communication systems. Nowadays, modern radio telecommunication systems offer users a wide variety of services in addition to a normal phone call.

Modern telecommunication systems may offer the users a possibility to communicate in the telecommunications system for example with an Internet Protocol Multimedia Subsystem (IMS) as defined by the 3GPP ($3^{rd}$ Generation Partnership Project). The IMS provides the radio system with multimedia services which usually, although not necessarily, are Internet-based services employing a packet protocol. In an implementation, the IMS maintains a list of the services it offers and their preferred access types, which may comprise radio access or network access types, or both. To exchange messages with the IMS, user equipment may in some systems use what is known as a Session Initiation Protocol (SIP), which is used in third generation systems for controlling sessions, especially multimedia sessions, in the packet network.

A conference call is a service where a call is established between three or more participants. Each participant in the conference call is able to monitor the transmissions of all other participants and to make their own transmissions that can be received by all other participants. The transmission may be audio, such as in an ordinary call, or it may also comprise other media, such as video. All participants need not receive the same media. Thus, some participants may have a video connection and some an audio connection. The number of participants in an on-going conference call may vary.

The participating group may be a preselected group of users in the system. For example, a user may have user equipment with an address book comprising individual phone addresses and groups of several participants. Thus, with a single selection the user may initialize a group call with a predefined participant list.

Telecommunication systems supporting conference calls comprise one or more conference call servers, which manage conference calls, maintain call related signalling and are responsible for sending media streams to each participant. The actual implementation of a conference server may be realized with one or more physical servers.

In a telecommunication system, each party capable of communication has an address which identifies the party and with which the party can be contacted. In the SIP terminology the address is called a Uniform Resource Identifier (URI) or a SIP URI. It may, for example, have a form similar to an email address, or it may be a phone number. When a conference call is established in prior art systems, the party initiating the call must have certain information available before it can send a conference call set up message to the network. The user equipment must either know beforehand an address of a conference call server, or the user must dial in the address of that server manually. SIP also offers a user the possibility to create a conference by directly making use of the conference URI, where this URI has to be reserved and known by the network beforehand. A further option in a system utilizing SIP is that the user equipment has a conference-factory URI preconfigured in memory. In a system which utilizes SIP, the conference-factory URI is an address which responds to a call by creating a conference call. However, when no above-mentioned information is available, user equipment is unable to start a conference call.

SUMMARY OF THE INVENTION

The invention seeks to provide an improved method for initiating a conference call. According to an embodiment of the invention, there is provided a method of initiating a conference call in a telecommunication system. The method comprises sending a call set up message by user equipment, a message header indicating the equipment's own public identity as the call recipient and a tag indicating that the user equipment only accepts a conference call server as the recipient of the message, receiving the message by a network element configured to process messages from the user equipment, redirecting the message to a conference call server on the basis of header fields of the message, detecting by the conference call server that the message is a conference call set up message on the basis of the header fields of the message, establishing a conference call by the conference call server.

According to another embodiment of the invention, there is provided a method of initiating a conference call in a telecommunication system utilizing a Session Initiation Protocol (SIP). The method comprises: sending an INVITE message by user equipment, the message comprising the same public identity in a P-Preferred-Identity and Request URI header fields and an isfocus-tag in an Accept-Contact header, receiving the message by a network element acting as a SIP-Registrar for the user equipment, redirecting the message to a network element acting as a SIP Focus on the basis of the header fields of the message, detecting by the SIP Focus that the message is a conference call set up message on the basis of header fields of the message, establishing a conference call by the SIP Focus on the basis of the header fields of the message.

According to another embodiment of the invention, there is provided an arrangement for initiating a conference call in a telecommunication system. The arrangement comprises: user equipment configured to send a call set up message by the user equipment, a message header indicating the equipment's own public identity as the call recipient and a tag indicating that the user equipment only accepts a conference call server as the recipient of the message, a first network element for receiving messages from the user equipment, for analyzing header information in the messages and for redirecting messages to a conference call server on the basis of header fields of the message, a conference call server for establishing a conference call on the basis of the header fields of the message.

According to further embodiment of the invention, there is provided user equipment in a telecommunication system. The user equipment is configured to send a call set up message in response to a command given by the user of the equipment, the message header indicating the equipment's own public identity as the call recipient, and a tag indicating that the user equipment only accepts a conference call server as the recipient of the message.

According to another embodiment of the invention, there is provided a network element in a telecommunication system. The network element comprises user equipment capable for requesting conference call services from the system and a conference call server. The network element is configured to receive messages from the user equipment, to analyze header information in the messages and to redirect messages to the conference call server when the message header comprises the equipment's own public identity as the call recipient and the call originator, and a tag indicating that the user equipment only accepts a conference call server as the recipient of the message.

According to another embodiment of the invention, there is provided a conference call server in a telecommunication system. The conference call server comprises user equipment capable of requesting conference call services from the system. The system utilizes an Internet Protocol Multimedia Subsystem. The server is configured to receive messages originated from the user equipment, to analyze header information in the messages and to establish a conference call when a message header comprises the equipment's own public identity as the call recipient and the call originator, and a tag indicating that the user equipment only accepts a conference call server as the recipient of the message.

According to an embodiment of the invention, user equipment wishing to initialize a conference call sends a call set up message, in which both the recipient and the sender is the user equipment itself. In systems utilizing the SIP, the call set up message, or the INVITE message, both the request-URI and the P-Preferred-Identity-URI contain the same public identity (SIP URI) of the user equipment. In addition, the message contains an information tag that denotes that the sender of the message requires the message to be forwarded to an entity capable of acting as a conference call server (a SIP Focus). The network element receiving the message, either directly or via a proxy, analyzes the information contained in the message and is configured to redirect the message to a conference call server, or a SIP focus in systems utilizing the SIP.

The method and system of the invention provide several advantages. One advantage is that the user need not have any prior knowledge of any conference server. A conference call set up may be initialized without any prior knowledge or pre-configuration and without the need to access any specific information from other sources.

BRIEF DESCRIPTION OF THE DRAWINGS:

In the following, the invention will be described in greater detail with reference to the preferred embodiments and the accompanying drawings, in which.

DETAILED DESCRIPTION OF THE PREFERRED EMBODIMENTS:

The embodiments of the invention can be realized in telecommunication systems such as those utilizing a Session Initiation Protocol (SIP) and especially systems where Internet Protocol Multimedia Subsystem (IMS) is used. The SIP is defined by the Internet Engineering Task Force (IETF) in standard RFC 3261. There are several additions to the SIP protocol, for example relating to conference calls. The access method to the telecommunication system may be a radio access system, an other wireless access system or a wire line access system.

First, SIP messaging used in telecommunication systems utilizing the IMS is briefly discussed. The SIP is a transaction protocol that can be used to implement different types of services. In the IMS, SIP messages are used for example to initiate and manage calls. In the SIP, each transaction consists of a request sent by a client. The request invokes a given method or function on a server and at least one response to the client. For example, a call set up message uses an INVITE SIP method, and a simplified example of a general call set up message may be of the form INVITE sip:johndoe@srvr.com SIP/2.0
Via:        SIP/2.0/UDP        pc33.chicago.com; branch=z9hG4bK776asdhds
P-Preferred-Identity: Jack <sip:jackdoe@anthsrvr.com>
From: Jack <sip:jackdoe@anthsrvr.com>;tag=1928301774
To: John <sip: johndoe@srvr.com>
Call-ID: a84b4c76e66710@pc33.chicago.com
CSeq: 314159 INVITE
Contact: <sip:jackdoe@pc33.chicago.com>

The first line of the message contains the name of the method (INVITE) and a so-called Request-URI, which correspond to the recipient of the message (in this example, johndoe@srvr.com). The underlined sections are header fields of the message. The To-field defines the address (URI) of the recipient of the message, but is not necessarily a valid URI, as this might be used, for example, in gaming applications such as "Alien.Blaster@star wars." Therefore this address does not necessarily correspond to the Request-URI field. The address of the sender or originator of the message is contained in the From-field, the same restrictions as mentioned for the To header apply here as well. The P-Preferred-Identity holds a valid URI of the sender of the message for the creation of an asserted identity within the IMS in order to indicate that the user sending this message is showing a valid identity. The Call-ID defines a globally unique identifier for the call. The combination of the To-tag, From-tag and Call-ID fields define a peer-to-peer SIP relationship between participants and is called a dialog. The definitions of the other fields are well known to one skilled in the art and they are not discussed in detail in this case. The message may also contain other fields not shown in the example above for simplicity.

Figure 1:
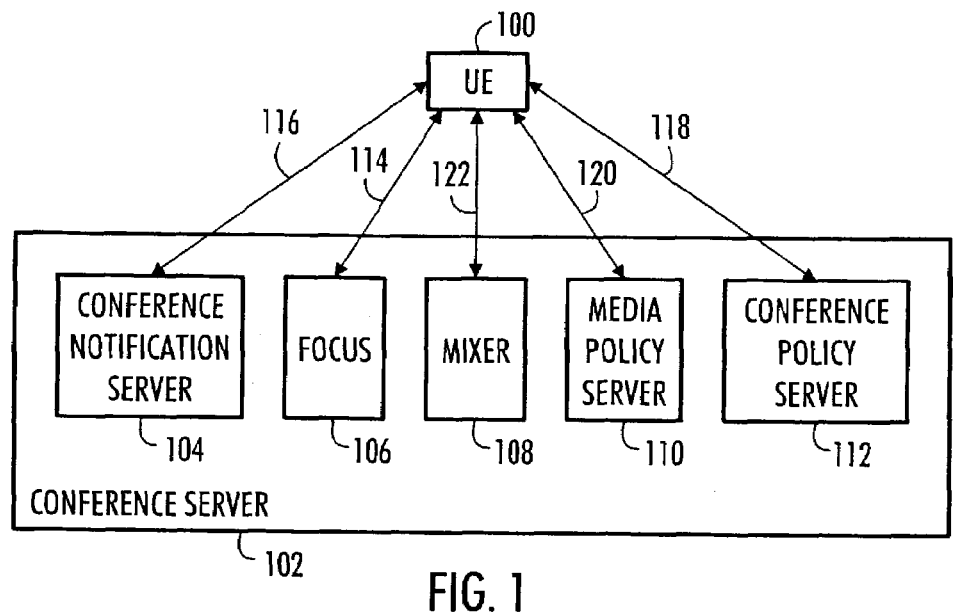
FIG. 1 illustrates a general framework for SIP conferences according to an embodiment of the invention.

The framework for the SIP conferences is briefly discussed with reference to FIG. 1. FIG. 1 shows a conference call server 102 and user equipment 100 acting as a conference call participant. The conference call server 102 comprises five entities, a conference notification server 104, a focus 106, a mixer 108, a media policy server 110 and a conference policy server 112. These entities have different functions but not all five entities are mandatory.

The conference notification server 104 handles notifications to the participants about e.g. other participants disconnecting from and joining the conference call. The focus 106 acts as a SIP user agent. Namely, the focus 106 communicates with the participants using SIP messages. The focus maintains dialogs connected to the users. The focus also controls media sessions by ensuring that the participants receive the required media from the conference, but the focus 106 does not receive or send media on its own. The focus accepts and rejects the participants of the conference call. The mixer 108 combines different media streams from participants and sends one or more combined streams to each participant. Each participant's own stream is not sent back to the participant. The mixer is controlled by the focus 106. The media policy server 110 takes care of the rules based upon how the mixer 108 combines the media streams. The conference policy server 112 contains rules which instruct the focus 106 how to operate. The rules may comprise access lists of the participants allowed to join the conference, and the roles of the participants, etc.

The user equipment 100 is in connection with the conference call server 102 in several ways. SIP dialogue 114 is handled by the focus 106. Joining and disconnecting from conference calls takes place through messages 116 with the conference notification server 104. The conference policy control 118 communicates with the conference policy server 112. The media policy control 120 communicates with the media policy server 110. In practice, these messages may be implemented with SIP messages through the focus 106. The media streams 122 communicate with the mixer 108.

Figure 2:
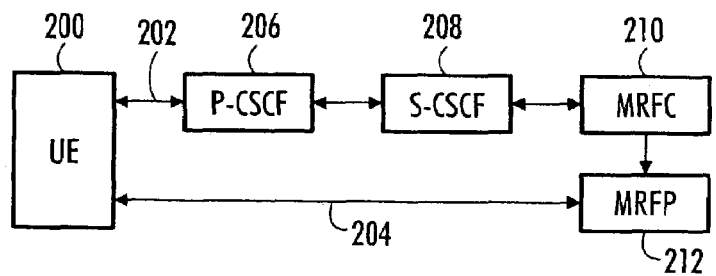
FIG. 2 illustrates entities regarding conference calls in a telecommunication system utilizing IMS according to an embodiment of the invention.

Next, the entities regarding the conference calls in a telecommunication system utilizing the IMS are presented with reference to FIG. 2. FIG. 2 shows logical connections between the entities of the network. As well known to one skilled in the art, a practical telecommunication system may also comprise other network elements and connections, such as base stations, radio network controllers, etc. For simplicity, these details are not displayed in FIG. 2, and they are not discussed in detail. The system of FIG. 2 may be for example a 3$^{rd}$ generation telecommunication network such as UMTS (Universal Mobile Telecommunication System). The actual connection between user equipment and the network may be realized for example using UTRA (Universal Terrestrial Radio Access) of UMTS or a GPRS (General Packet Radio Service) based radio access network or other similar services offering arrangements such as WLAN (Wireless Local Area Network) or an Ethernet-based network.

The system comprises user equipment 200, which can be a portable mobile phone, or a laptop or an other device comprising the ability to set up one or more connections 202, 204 with the network. The connections 202, 204 are typically, but not necessarily, wireless connections. The user equipment has a connection 202 to a Proxy Call Session Control Function (P-CSCF) 206, which is the first contact point of the user equipment in the IMS. The P-CSCF acts as a proxy server, by accepting requests from the user equipment and passes the requests on. One function of the P-CSCF is to assure the identity of the sender by checking the identity expressed in the above mentioned P-Preferred-Identity header and replacing that header with a P-Asserted-Identity header with the same content as the P-Preferred-Identity header if the identity indicated therein is a valid identity of the user.

The P-CSCF forwards the messages from the user equipment to a Serving Call Session Control Function (S-CSCF) 208. The S-CSCF performs session control services for the user equipment and serves as the SIP Registrar. All SIP signaling from and to the user equipment is sent via the S-CSCF. The S-CSF is aware of the services that are available to the user equipment and activates the services on the basis of the messages sent to or from the user equipment. The S-CSCF is also responsible for determining where to send messages from the user, i.e. finding the next server on the way to a called user. Both the P-CSCF 206 and the S-CSCF 208 are assigned to the user equipment 200 when the user equipment registers to the network.

The system also comprises a Multimedia Resource Function Controller (MRFC) 210 operationally connected to the S-CSCF 208, and a Multimedia Resource Function Processor (MRFP) 212. The MRFC acts as a SIP focus, and controls the media stream processing performed by the MRFP which acts as a SIP mixer. The MRFP receives a media stream 204 from the user equipment 200 and transmits a mixed media stream 204 back to the user equipment 200.

In an embodiment of the invention, the other entities of a SIP conference call server (the media policy server, the conference policy server and the conference notification server) may also be located in the MRC 210. These entities may also be located elsewhere on different servers in the network. The location of these entities is not described in the preferred embodiments of the invention. Signaling flows to and from these entities are not described here for simplicity.

Figure 3:
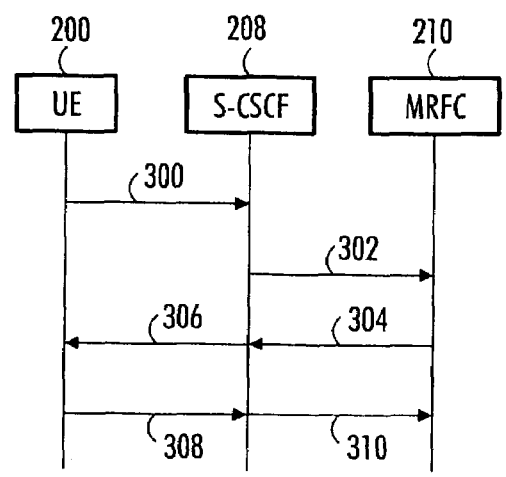
FIG. 3 shows a signal diagram according to an embodiment of the invention.

FIG. 3 shows a simplified signal diagram illustrating an embodiment of the invention. Basic signaling relating to a request for setting up a conference call is shown between the user equipment 200, the S-CSCF 208, which is a network element configured to process messages from the user equipment, and the MRFC 210 acting as a conference call server. The user equipment 200 generates and sends a call set up message 300, where the user equipment designates the same public user identity as the recipient and the originator of the message and indicates that the user equipment only accepts a conference call server as the recipient of the message.

The S-CSCF 208 receives the message. When the S-CSCF identifies that the same public user identity is designated as the recipient and the originator and that the message indicates that the receiving entity should be a conference call server, the S-CSCF selects a MRFC 210 of the network that can act as a conference call server and redirects 302 the message to the MRFC.

The MRFC 210 receives the message. When the MRFC 210 notices that the message indicates that the user equipment accepts only a conference call server as the recipient of the message and that the originator and the recipient are designated to be the same, the MRFC 210 creates a conference call. The MRFC 210 generates an OK message which comprises its public user identity and transmits the message 304 to the S-CSCF 208 which forwards the message 306 to the user equipment 200. The user equipment responds with an acknowledgement message 308, which is routed 310 via the S-CSCF to a MRFC 210.

Figure 4:
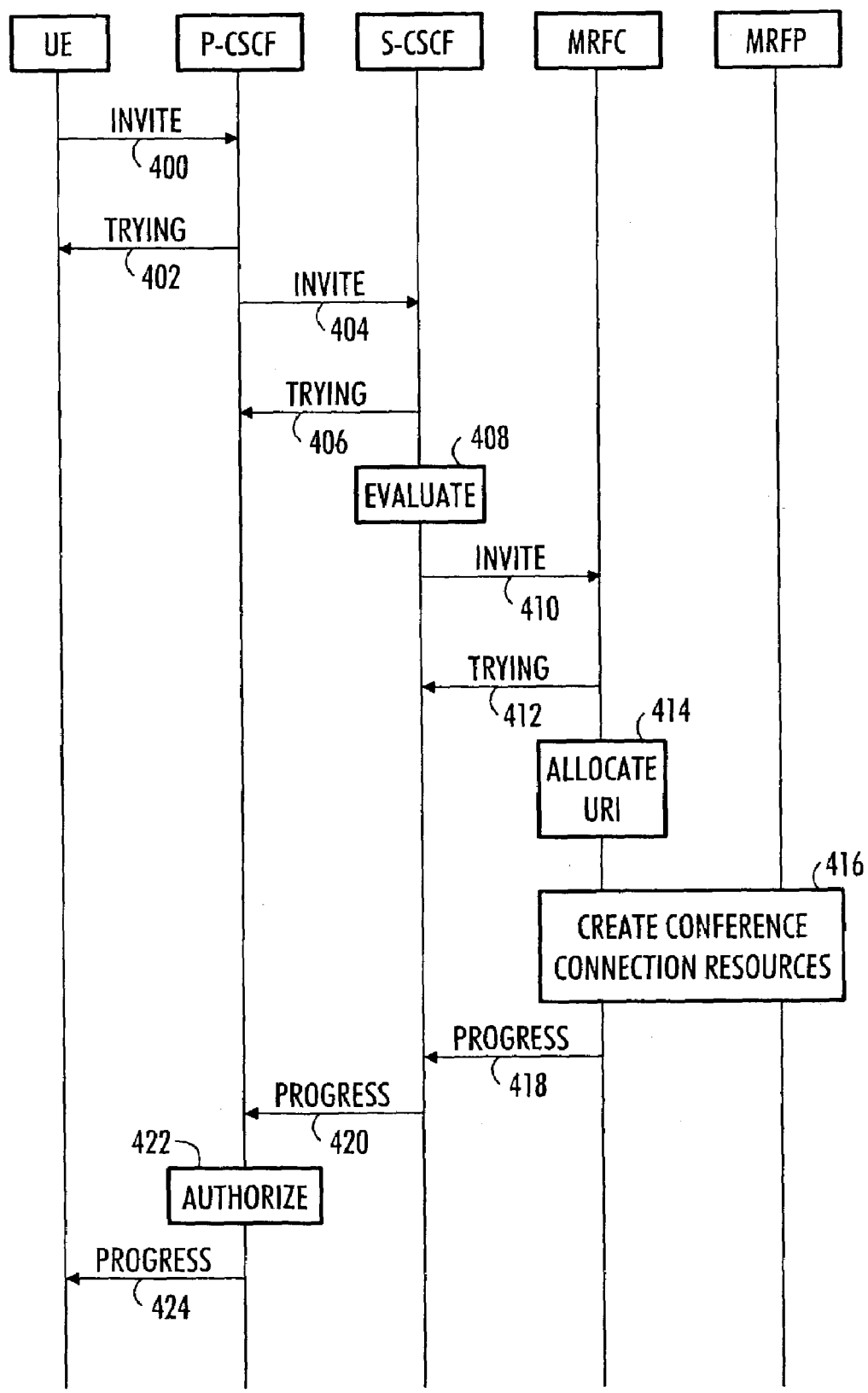
FIG. 4 illustrates another signal diagram illustrating an embodiment of the invention.
Figure 5A:
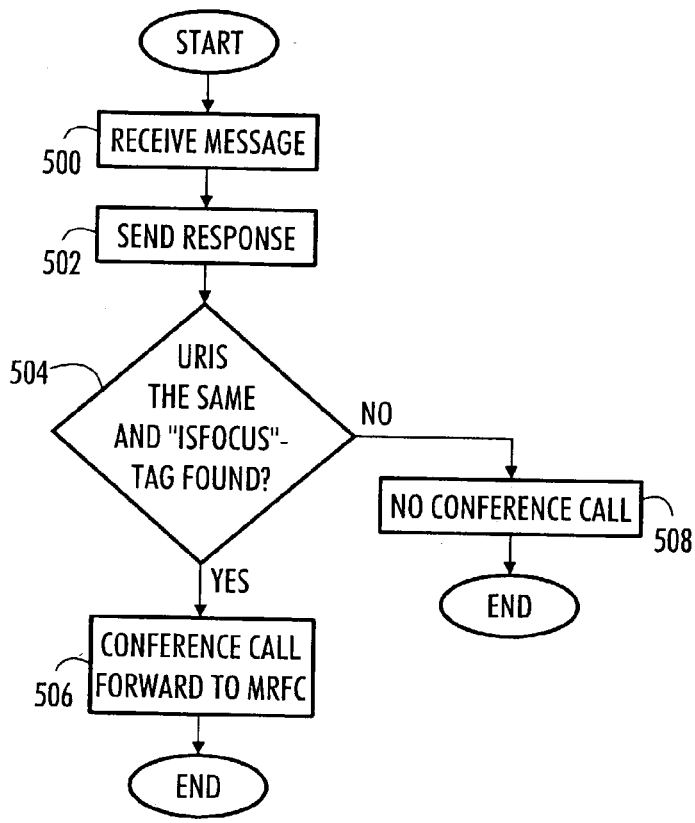
FIGS. 5A and 5B illustrate actions of network elements, according to an embodiment of the invention.
Figure 5B:
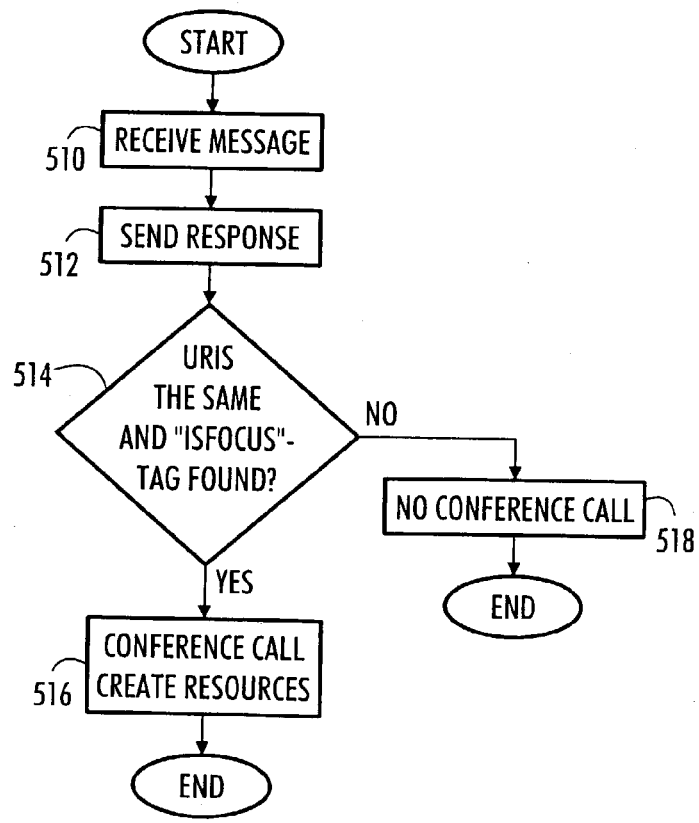

According to one embodiment of the invention as illustrated with the aid of the signal diagram of FIG. 4 and the flow charts of FIGS. 5A and 5B. FIG. 4 shows basic signaling, which relates to the request for setting up a conference call between the user equipment 200. The P-CSCF 206 acts as a proxy, the S-CSCF 208 acts as a SIP Registrar, the MRFC 210 acts as a SIP focus, and the MRFP 212 acts as a SIP mixer. FIGS. 5A and 5B illustrate the actions of the S-CSCF 208 and the MRFC 210.

The user equipment 200 generates and sends a call set up message 400 (a SIP message with an INVITE method). The message may comprise the following fields:
INVITE sip:user1_public1@home1.net SIP/2.0
Via: SIP/2.0/UDP [5555::aaa:bbb:ccc:ddd]:1357
Route: <sip:pcscf1.visited1.net:7531;lr;comp=sigcomp>, <sip:orig@scscf1.home1.net;1r>
P-Preferred-Identity: "John Doe" <sip:user1_public1@home1.net>
From: <sip:user1_public1@home1.net>; tag=171828
To: <sip:user1_public1@home1.net>
Call-ID: cb03a0s09a2sdfglkj490333
Cseq: 127 INVITE Contact: <sip:[5555::aaa:bbb:ccc:ddd]:1357; comp=sigcomp>
Accept-Contact: *;isfocus It should be noted here that a complete INVITE message also comprises other fields and headers which have not been shown above for simplicity. The shown headers as well may also comprise additional information not shown above. For example, the conference set up message may comprise public identities of other user equipment invited to be participants in the conference call. In addition, the user equipment may determine a set of media types, code rates and codecs that are capable of providing support for this conference call. This information may also be included in the message.

The request-URI field after the INVITE method definition contains the user's public user identity. Via-header comprises the IP address of the originating user equipment. Route-header may comprise the address of the P-CSCF. P-Preferred-Identity header comprises the same URI as the request-URI. From- and To-headers comprise the same URI as the request-URI. This, however, is not mandatory. Cseq-header comprises a random starting number. Contact-header comprises a SIP URI that contains the IP address of the originating user equipment. Accept-Content-header comprises "isfocus" value. This "isfocus" tag in the Accept-Contact header of a SIP request indicates that the originator wants the request to be routed to an entity that is able to perform the SIP conferencing focus functionality. The user thus instructs the system to connect the session to a SIP focus in order to create a conference call. In the case of the IMS the entity is the MRFC 210.

The P-CSCF responds to the INVITE request 400 with a '100 Trying' response 402. This response indicates to the user equipment that the INVITE message was received and that the P-CSCF is processing the message.

The P-CSCF adds itself to the RecordRoute- and Via-headers. The P-CSCF also inserts the URI from P-Preferred-Identity to a P-Asserted-Identity-header and removes the former from the message. The INVITE request is then forwarded 404 to the S-CSCF 208. The forwarded message may comprise the following fields:
INVITE sip:user1_public1@home1.net SIP/2.0
Via: SIP/2.0/UDP pcscf1.visited 1.net; branch=z9hG4bK240f34.1,
SIP/2.0/UDP [5555::aaa:bbb:ccc:ddd]:1357; comp=sigcomp; branch=z9hG4bKnashds7
Route: <sip:orig@scscf1.home1.net;1r>
Record-Route: <sip:pcscf1.visited1.net;1r>
P-Asserted-Identity: "John Doe" <sip: user1_public1@home1.net>
From: <sip:user1_public1@home1.net>; tag=171828
To: <sip:user1_public1@home1.net>
Call-ID: cb03a0s09a2sdfglkj490333
Cseq: 127 INVITE
Contact: <sip:[5555::aaa:bbb:ccc:ddd]:1357; comp=sigcomp>
Accept-Contact: *;isfocus Again it should be noted that a forwarded message may also comprise other fields and headers which have not been shown above for simplicity.

The S-CSCF receives 500 the message and responds 502 to the INVITE request 404 with a '100 Trying' response 406. The S-CSCF validates 408 the service profile of the subscriber and evaluates 504 the message. S-CSCF checks whether the URIs in the Request-URI and in the P-Asserted-Identity are identical and whether the tag "isfocus" is in the Accept-Contact header. If both of these conditions are true 506, the S-CSCF selects a MRFC 210 of the network that can create and control a conference call requested by the originating user. S-CSCF forwards 410 the INVITE request to the MRFC 210 because of the value of the Accept-Contact header. If not all requirements for a conference call are met 508, the message is not forwarded to the MRFC.

The MRFC 210 receives 510 the INVITE message and responds 512 by sending a '100 Trying' response 412 to the S-CSCF 208.

The MRFC 210 checks 514 whether the URIs in the Request-URI and in the P-Asserted-Identity are identical and whether the tag "isfocus" is in the Accept-Contact header. If both of these conditions are true 516, the MRFC allocates 414 a conference URI, based on local information as well as on information gained from other elements of the SIP signaling. Next, the MRFC creates 416 conference connection resources with the MRFP 212. For example, the MRFC creates an IMS connection point for the user equipment 200 in MRFP. If not all requirements for a conference call are met 518, the MRFC does not perform conference call set up actions.

The MRFC 210 sends a "183 Session Progress" message 418 to the S-CSCF 208 which, in turn, forwards the message 420 to the P-CSCF 206. The P-CSCF authorizes 422 the resources necessary for the session and sends a "183 Session Progress" message 424 to the user equipment 200. Instead of a "183 Session Progress" message some other message may also be used, such as a 180 message, for example.

The procedure continues from here, according to a known method of conducting a conference call, where the user equipment has prior knowledge of the conference call server.

Even though the invention has been described above with reference to the examples according to the accompanying drawings, it is clear that the invention is not restricted thereto but can be modified in several ways within the scope of the appended claims.

What is claimed is:

1. A method of initiating a conference call in a telecommunication system, the method comprising:
    sending a call set-up message by user equipment, a message header indicating a public identity of the user equipment as a call recipient, and a tag indicating that the user equipment only accepts a conference call server as a recipient of the call set-up message;
    receiving the call set-up message by a network element configured to process messages from the user equipment;
    redirecting the call set-up message to a conference call server based on header fields of the call set-up message;
    detecting by the conference call server that the call set-up message is a conference call set-up message based on the header fields of the message; and
    establishing a conference call by the conference call server.

2. The method of claim 1, wherein the step of sending a call set-up message by the user equipment, further comprising providing the message header comprising the public identity of the user equipment as a call originator.

3. The method of claim 2, further comprising:
    detecting by the network element a reception of the call set-up message that the message header comprises two identical public identities as the call originator and a call recipient.

4. The method of claim 2, further comprising:
    receiving the call set-up message from the user equipment by a proxy network element;

validating the user equipment as the call originator;

sending the call set-up message to the network element configured to process messages from the user equipment.

5. The method of claim 1, wherein the conference set up message comprises public identities of another user equipment invited to be a participant in the conference call.

6. An arrangement for initiating a conference call in a telecommunication system, the arrangement comprising:

a user equipment configured to send a call set up message a message header indicating a public identity of the user equipment as a call recipient, and a tag indicating that the user equipment only accepts a conference call server as a recipient of the call set up message;

a first network element for receiving messages from the user equipment, for analyzing header information in the messages and for redirecting messages to a conference call server based on header fields of the call set up message;

a conference call server for establishing a conference call based on the header fields of the call set up message.

7. The arrangement of claim 6, further comprising:

a proxy network element for receiving the call set up message from the user equipment;

for validating the user equipment as a call originator and for sending the call set up message to the network element configured to process messages from the user equipment.

8. User equipment in a telecommunication system, the user equipment being configured to send a call set up message in response to a command given by a user of the equipment, a message header indicating a public identity of the user equipment as a call recipient, and a tag indicating that the user equipment only accepts a conference call server as a recipient of the call set-up message.

9. A network element in a telecommunication system comprising user equipment capable for requesting conference call services from the system and a conference call server, the network element being configured to receive messages from the user equipment, to analyze header information in the messages and to redirect the messages to the conference call server when a message header comprises a public identity of the user equipment as a call recipient and a call originator, and a tag indicating that the user equipment only accepts a conference call server as a recipient of the messages.

10. A conference call server in a telecommunication system comprising user equipment capable of requesting conference call services from the system, the conference call server being configured to receive messages originated from the user equipment, to analyze header information of the messages and to establish a conference call when a message header comprises a public identity of the user equipment as the call recipient, and a call originator, and a tag indicating that the user equipment only accepts a conference call server as a recipient of the messages.

11. An arrangement for initiating a conference call in a telecommunication system, the arrangement comprising:

sending means for sending a call set up message by user equipment, a message header indicating a public identity as a call recipient, and a tag indicating that the user equipment only accepts a conference call server as a recipient of the call set-up message;

receiving means for receiving the call set-up message by a network element configured to process messages from the user equipment;

redirecting means for redirecting the call set-up message to a conference call server based on header fields of the call set-up message;

detecting means for detecting by the conference call server that the call set-up message is a conference call set-up message based on the header fields of the message; and establishing means for establishing a conference call by the conference call server.

12. An arrangement for initiating a conference call in a telecommunication system, the arrangement comprising:

sending unit configured to send a call set up message by user equipment, a message header indicating a public identity as a call recipient, and a tag indicating that the user equipment only accepts a conference call server as a recipient of the call set-up message;

receiving unit configured to receive the call set-up message by a network element configured to process messages from the user equipment;

redirecting unit configured to redirect the call set-up message to a conference call server based on header fields of the call set-up message;

detecting unit configured to direct by the conference call server that the call set-up message is a conference call set-up message based on the header fields of the message; and establishing unit configured to establish a conference call by the conference call server.

* * * * *